(No Model.)
W. P. STEVENSON.
HAND ROCK DRILL.
No. 246,983.  Patented Sept. 13, 1881.
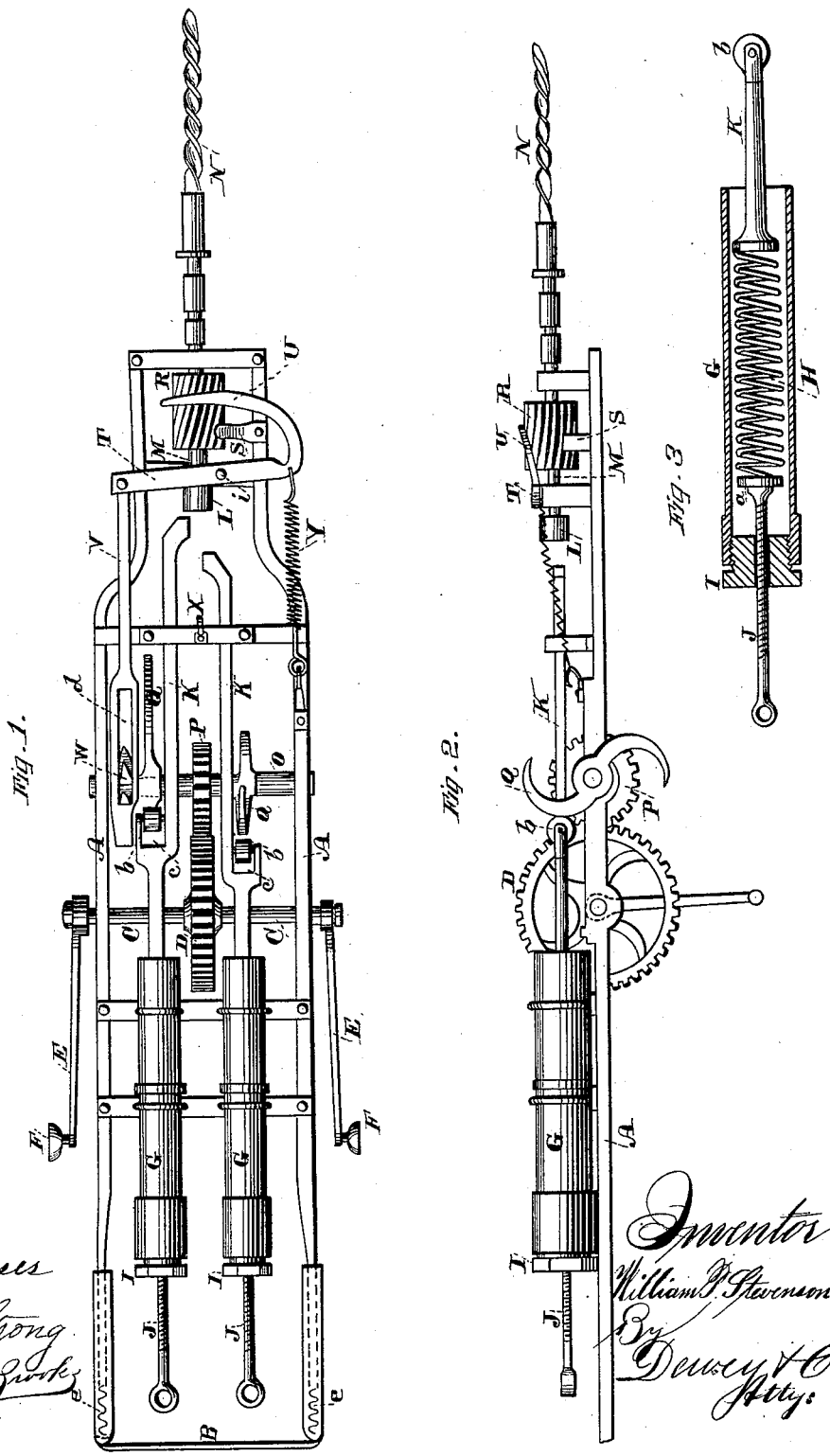

UNITED STATES PATENT OFFICE.

WILLIAM P. STEVENSON, OF VALLECITO, CALIFORNIA, ASSIGNOR, BY DIRECT AND MESNE ASSIGNMENTS, OF ONE-HALF TO THEODORE R. ANDREWS, OF SAME PLACE, AND THEODORE W. STERLING, OF NEW YORK, N. Y.

HAND ROCK-DRILL.

SPECIFICATION forming part of Letters Patent No. 246,983, dated September 13, 1881.

Application filed June 14, 1881. (No model.)

*To all whom it may concern:*

Be it known that I, WILLIAM P. STEVENSON, of Vallecito, county of Calaveras, State of California, have invented an Improved Hand Rock-Drill; and I hereby declare the following to be a full, clear, and exact description thereof.

My invention relates to the class of rock-drills, and more especially to those which are operated by hand and are known as "hand" rock-drills; and it consists in a means for rapidly and forcibly striking the drill, and at the same time turning it by appropriate mechanism. This is accomplished by means of arms which are drawn back by cams and forced forward by springs, these arms coming in contact forcibly with a movable head to which the drill is attached.

The operating mechanism, through a cam, moves a lever in such a way as to operate a pull, which engages with a ratchet-wheel upon the head which receives the drill, thereby turning it. All of this will hereinafter fully appear.

Referring to the accompanying drawings, Figure 1 is a top view of my drill. Fig. 2 is a side view. Fig. 3 is a section of the cylinder.

This device being a hand rock-drill, it is adapted to be easily carried and held in proper position when at work. It consists of a main frame, A. At the head of the frame is a piece, B, which fits over the ends of the frame. It has small springs e inside, against which the ends of the frame press, and by this means, when holding the machine against the breast in working it, unpleasant jar is avoided.

Across the frame on its under side, journaled in suitable bearings, is the main shaft C, which carries the gear-wheel D. The ends of the shaft C are adapted to receive the arms or cranks E E, the ends of which have suitable handle-pieces, F, as shown.

Upon the top of the frame, and lying parallel with its sides, are the tubes or pipes G G, properly secured to cross-pieces of the main frame. Within these pipes are contained the spiral or coiled springs H, made very powerful and of the best material.

In the rear ends of the pipes are screw-heads I, through which pass screws J, having on their inner ends, within the pipes or tubes, a nut or washer, a, which presses against the ends of the springs H. These are for the purpose of adjusting the power of the springs, for by tightening up the screws J the springs may be compressed so as to exert greater force.

K K are arms, the rear ends of which pass within the forward ends of the tubes G G and press against the springs H. Their forward ends are in line to strike against the head L, which is upon a rod, M, which slides loosely in the cross-pieces of the forward end of the frame. This bar or rod M receives at its end, in any suitable manner, the drill N.

The drill may be in any suitable form, but is secured tightly to the head-rod M, so as to be affected by said rod.

O is a secondary cross-shaft, carrying the pinion P, which meshes with the gear-wheel D upon the main shaft. This shaft carries two S-shaped cams, Q Q, which operate against rollers b b, journaled in shoulders c c of the arms K K. The cams Q Q are so set that each arm operates the arms K K alternately, thus imparting to said arms a reciprocating movement. Now, by operating the cranks E E the cams Q Q are revolved and alternately push back the arms K K, so that their rear ends compress the springs H. When the arms are relieved from the cams the springs force them forward with considerable power, so that their forward ends strike against the head L and drive the drill forward. The end of the drill being always pressed against the substance which is being drilled keeps the head L back far enough to receive the stroke of the arms, and thus allows it to have the necessary play. If I make my main gear D twice as large as my pinion P, it is obvious that at every revolution of the cranks E E the cams Q Q turn twice, and having four points or arms, I am thus enabled to have eight strokes upon the drill at every turn. This is a mere matter of adjustment, for I could obtain more or fewer strokes by increasing or diminishing the number of gears.

It is obvious that, instead of having the first main shaft C, I could drive from the second shaft, dispensing with all gearing; but I consider it better to operate the device as herein shown.

In order to cause the drill to turn, I have the following device: Upon the rod M is a ratchet-wheel, R. S is a retaining-pawl. Upon one of the cross-pieces of the frame A is a bar, T, pivoted to the cross-piece at the point marked i. One end of this bar has a curved operating-pawl, U, which engages with the ratchet-wheel R. The other end has pivoted to it a connecting arm or strip, V, which passes back to and curves over and under the shaft O, as shown. It has an extended slot, d, in which a small cam-wheel, W, upon the shaft O operates. When the shaft O is revolved the cam-wheel W draws the arm V back, which throws the other end of the bar T forward, and the pawl U is forced forward to turn the ratchet-wheel R, and thus turn the rod M and the drill. As before stated, the rod M is loosely fitted in the frame A, so that it is adapted to move forward or revolve. Y is a spring attached to the bar T and to the frame, for the purpose of drawing back the bar T, so that the arm V will be brought forward again to allow the cam-wheel W to operate upon it. The retaining-pawl S holds the ratchet-wheel when relieved of the operating-pawl.

The operation is as follows: The device is intended to be hung from the shoulders by any suitable harness or strap which will hold the end B against the breast of the workman, and when being worked in convenient positions a strap may pass from the neck to the forward end of the frame. For this purpose I have here shown a hook, X, to which the neck-strap may be connected. The end B being held against the breast, the drill is pressed against the rock and the cranks E E turned. The cams Q Q force the beater-arms K K back against the springs H in the tubes, and the springs impel them forward when relieved from the cams, so that their ends strike on the head L of the rod M, which receives the drill, and thus drives said drill forward. At the same time the cam-wheel W operates the pawl U and revolves the drill. By screwing in the screws J the springs H may be compressed to exert more power.

I am aware that hand rock-drills in which a blow is given to the device by means of mechanism operated by springs have been used, and that to turn the drill at the same time is not new. I do not therefore claim such devices, broadly; but What I do claim as new, and desire to secure by Letters Patent, is—

1. The hand rock-drill consisting of the frame A, the spring-containing tubes G G, with their springs H, the reciprocating beater-arms K K, forced back by the cams Q Q operating against the rollers b b, and revolved either directly or by intermediate gearing, D and P, by means of cranks E E, and impelled forward by the springs H, the loosely-journaled rod M, with its head L for receiving the blows of the arms K K, and a drill fastened to the rod M, when arranged substantially as and for the purpose herein described.

2. In a hand rock-drill of which the frame is A, the means for driving the drill forward, consisting of the beater-arms K K, adapted to strike alternately the head L of a rod, M, to which the drill is attached, said arms being thus adapted by means of the cams Q Q, revolved either directly or through intermediate gears, D and P, and the springs H, in combination with the means for turning said drill, consisting of the operating and retaining pawls U and S, ratchet-wheels R, rod M, spring Y, bar T, connecting-arm V, with its slot d, and cam-wheel W, revolved either directly or through intermediate gears, D and P, when arranged substantially as and for the purpose herein described.

3. In a hand rock-drill adapted to be held against the breast and its recoil thereby resisted, the combination of the frame A, provided with telescopic ends, end B, and springs e, substantially as and for the purpose herein described.

In witness whereof I have hereunto set my hand.

WILLIAM P. STEVENSON.

Witnesses:
WM. F. BOOTH,
J. H. BLOOD.